United States Patent
Yasumura et al.

(10) Patent No.: US 7,121,003 B2
(45) Date of Patent: Oct. 17, 2006

(54) MANUFACTURING METHOD AND MANUFACTURING APPARATUS FOR WHEEL-SUPPORT ROLLING BEARING UNIT

(75) Inventors: Masahiro Yasumura, Fujisawa (JP); Nobuyuki Hagiwara, Fujisawa (JP); Shoji Horike, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/018,424

(22) Filed: Dec. 21, 2004

(65) Prior Publication Data

US 2005/0126005 A1    Jun. 16, 2005

Related U.S. Application Data

(63) Continuation of application No. PCT/JP03/07812, filed on Jun. 19, 2003.

(30) Foreign Application Priority Data

Jun. 24, 2002  (JP) .............................. 2002-182365

(51) Int. Cl.
  *B21D 53/10* (2006.01)
  *B23P 19/04* (2006.01)

(52) U.S. Cl. ..................... 29/894.362; 29/894.361; 29/898.07; 29/898.09; 29/898.062; 29/509; 29/724; 29/725

(58) Field of Classification Search ........... 29/898.062, 29/898.07, 894.362, 509, 724, 725
  See application file for complete search history.

(56) References Cited

U.S. PATENT DOCUMENTS

| 6,622,377 | B1 * | 9/2003 | Johnson et al. ................ 29/724 |
| 6,640,438 | B1 * | 11/2003 | Webb et al. ........... 29/894.362 |
| 6,857,190 | B1 * | 2/2005 | Gavard et al. ......... 29/898.062 |

FOREIGN PATENT DOCUMENTS

| JP | 2000-317552 | * | 11/2000 |
| JP | 2000-343905 | * | 12/2000 |
| JP | 2001-022016 |   | 1/2001 |
| JP | 2003-021153 | * | 1/2003 |
| JP | 2003-028179 | * | 1/2003 |
| WO | 98/58762 | * | 12/1998 |
| WO | 2004/001247 | * | 12/2003 |

* cited by examiner

*Primary Examiner*—Eric Compton
(74) *Attorney, Agent, or Firm*—Katten Muchin Rosenman LLP

(57) ABSTRACT

In a manufacturing method and a manufacturing apparatus for a wheel-support rolling bearing unit, when forming a crimped portion 14 on an end (inside end) of a hub main body 8*a*, by rocking die forging using a die 26, while preventing enlargement of equipment, in order to prevent forming indentations in a second outer raceway 6*a* and a second inner raceway 12*a*, in the present invention, the outer ring 1*a* is turned by a motor 48, and the balls 32 are rotated. A difference is provided between the rotation speed of the balls 32 and an oscillation speed of the die 26. This difference is preferably at least 10 min$^{-1}$. By rotating the balls 32 the formation of indentations in the second outer raceway 6*a* and the second inner raceway 12*a* is prevented. Moreover, by providing the difference between the rotation speed and the oscillation speed of the die 26, an increase in the torque required for rotation the outer ring 1*a* is suppressed.

5 Claims, 11 Drawing Sheets

(A)

(B)

MANUFACTURING METHOD AND MANUFACTURING APPARATUS FOR WHEEL-SUPPORT ROLLING BEARING UNIT

CROSS-REFERENCE TO RELATED APPLICATION

This application is a continuation of an International Application No. PCT/JP03/07812, which was filed on Jun. 19, 2003 and claims priority from Japanese Patent Application 2002-182365 filed on Jun. 24, 2002, which is herein incorporated by reference.

TECHNICAL FIELD

The present invention relates to improvements in a manufacturing method for a wheel-support rolling bearing unit for rotatably supporting a vehicle wheel of an automobile in relation to a suspension device, and to a manufacturing apparatus employed in the implementation of this manufacturing method.

BACKGROUND ART

A wheel-support rolling bearing unit is employed for rotatable support of a vehicle wheel of an automobile in relation to a suspension device. A structure as shown in FIG. 8 is disclosed in the wheel-support rolling bearing unit of Japanese Unexamined Patent Publication No. 2000-343905. This wheel-support rolling bearing unit rotabably supports a hub 2 being an inner diameter raceway member, on an inner diameter side of an outer ring 1 being an outer diameter raceway member, with first and second rows of tapered roller bearings 3, 4. The outer ring 1 is respectively formed with a tapered concave surface first outer raceway 5 for constituting the first row of tapered roller bearings 3 at one end (the end forming the widthwise outside of the vehicle when assembled in the vehicle, the left end in FIG. 8) of the inner peripheral surface, and a tapered concave surface second outer raceway 6 for constituting the second row of tapered roller bearings 4 at the other end (the end forming the widthwise center of the vehicle when assembled in the vehicle, the right end in FIG. 8), and a mounting portion 7 for supporting and fastening the outer ring 1 to the suspension device, is provided on the outer peripheral surface thereof.

Furthermore, the hub 2 is assembled with a hub main body 8 being the shaft member and an inner ring 9. The hub main body 8 is respectively formed with a flange 10 for supporting the vehicle wheel, on one end (outside end) of the outer peripheral surface, a tapered convex-shaped first inner raceway 11 for constituting the first row of tapered roller bearings 3 on the middle portion, and a stepped portion 13 of a diameter smaller than the part forming the first inner raceway 11 on the other end. In some cases, the first inner raceway 11 may be formed on the outer peripheral surface of a separate inner ring fitted onto the middle portion of the hub 8. Moreover, the inner ring 9 has a tapered convex-shaped second inner raceway 12 for constituting the second row of tapered roller bearings 4, on the peripheral surface. This inner ring 9 is an interference fit on the stepped portion 13, and is held against the step surface 15 of the stepped portion 13 by a crimped portion 14 provided on the other end (inside end) of the hub main body 8. This crimped portion 14 is formed at the other end of the hub main body 8, and is formed by use of a rocking press to plastically deform outward in the diameter direction a cylindrical portion 16 formed on at least the part protruding in the axial direction from the other end face of the inner ring 9 which is interference-fitted onto the stepped portion 13.

Furthermore, a plurality of tapered rollers 17 being rolling elements are held rotatably by first and second retainers 18 and 19 between the first and second outer raceways 5 and 6, and the first and second inner raceways 11 and 12, thus constituting the rolling bearings 3 and 4 of the first and second rows. In the case of a wheel-support rolling bearing unit for the heavy weight of a truck and the like, the tapered rollers 17 are employed as the rolling elements. However in the case of a wheel-support rolling bearing unit for automobiles being of comparatively light weight such as passenger cars and the like, the use of balls as the rolling elements is common. Moreover, in the example shown in the drawings, an opening at one end of a space 21 wherein the plurality of tapered rollers 17 are provided is sealed by a seal ring 20 supported on one end of the outer ring 1. While omitted from the drawings, an opening at the other end of this space 21 is also sealed by another seal ring, or is blocked by a cover attached to the other end of the outer ring 1, thus preventing leakage to the outside of lubricant such as grease and the like from the space 21, and entry of foreign matter such as mud and water and the like into the space 21 from the outside.

When assembling the wheel-support rolling bearing unit configured as explained above, the outer ring 1 is first placed over the periphery of the hub main body 8, and the plurality of tapered rollers 17 are provided between the first inner raceway 11 and the first outer raceway 5 and held in place with the first retainer 18. Additionally, the seal ring 20 is attached so as to block the opening at one end of the cylindrical space 21. The sequence of assembly up to this point varies slightly according to the structure of the wheel-support rolling bearing unit.

For example, in this case, of the wheel-support rolling bearing unit shown in FIG. 8, the plurality of tapered rollers 17 are first placed over the periphery of the first inner raceway 11 and held in place by the first retainer 18. In this condition, lubricant such as grease and the like is applied to the first inner raceway 11 and the rolling surfaces of each of the tapered rollers 17. Furthermore, the seal ring 20 is fitted onto and fastened to one end of the outer ring 1. In the example shown in the drawings, this seal ring 20 comprises a metal core 22 formed in an overall annular shape of L-shaped section, and an elastic material 23 also formed in an annular shape and fastened to the inside of this metal core 22 by baking or adhesion and the like. This metal core 22 is fitted onto and fastened to one end of the outer ring 1.

Next, the hub main body 8 is inserted from the other end through the outer ring 1 whereon this seal ring 20 is externally fitted and fastened, and this outer ring 1 is placed around the hub main body 8. By this insertion operation the first outer raceway 5 contacts the rolling surfaces of the plurality of tapered rollers 17 held by the retainer 18. Lubricant such as grease and the like is also applied to the outer raceway 5 prior to insertion through this outer ring 1. Moreover, when placing the outer ring 1 around the hub main body 8 as explained above, the leading edges of the plurality of seal lips provided in the elastic material 23 constituting the seal ring 20 contact (sliding contact during operation) the peripheral surface towards the end of the hub main body 8 and the side face of the base of the flange 10, sealing the opening in one end of the cylindrical space 21.

Once in the above manner, the plurality of tapered rollers 17 held by the first retainer 18 have been provided between the first inner raceway 11 and the first outer raceway 5 while placing the outer ring 1 around the hub main body 8, and the opening at the end of the space 21 has been blocked by the seal ring 20, then the inner ring 9 is fitted onto the other end of the hub main body 8. Prior to this fitting work, the plurality of tapered rollers 17 is provided held by the second retainer 19 around the second inner raceway 12 formed on the outer peripheral surface of this inner ring 9. In this condition, the inner ring 9 is interference-fitted onto the stepped portion 13 formed at the other end of the hub main body 8. As shown in FIG. 9, this fitting work is conducted with one end surface of the hub main body 8 mounted on the top surface of a support block 24, by pressing the inner ring 9 onto the stepped portion by a pressing jig 25. In association with the fitting work, the rolling surfaces of the plurality of tapered rollers 17 held by the second retainer 19 are brought into contact with the second outer raceway 6 formed on the inner peripheral surface towards the other end of the outer ring 1. At this time, the outer ring 1 is rotated, or rocked in a reciprocating manner, in relation to the hub main body 8, so that the rolling surfaces of the tapered rollers 17 are stabilized in contact with each of the raceways 5, 6, 11, and 12.

Next, the cylindrical portion 16 formed on the other end of the hub main body 8 is plastically deformed outwards in the diameter direction to form the crimped portion 14. As shown in FIG. 10, the forming work for this crimped portion 14 is conducted with one end surface of the hub main body 8 placed on the top surface of the support block 24, by pressing the cylindrical portion 16 with a die 26 being the compression member disclosed in the claims. A convex portion 27 of a truncated cone-shape able to be freely pressed into the cylindrical portion 16, is formed on a central part of the tip surface (bottom surface in FIG. 10) of this die 26, and a concave portion 28 of arc-shaped section is formed around the convex portion 27 and enclosing the perimeter of the convex portion 27. By pressing the die 26 having this shape of the convex portion 27 and concave portion 28 onto the tip end of the cylindrical portion 16, the tip end of the cylindrical portion 16 is deformed outwards in the diameter direction, so that the crimped portion 14 can be formed.

The central axis $\alpha$ of the die 26 is inclined at a small angle $\theta$ (for example, 1° to 3°) to the central axis $\beta$ of the hub main body 8. When the crimped portion 14 is formed, the die 26 is pressed against the hub main body 8 while being oscillated on its central axis $\alpha$ around the central axis $\beta$ (as with the orbit of the central axis during precession) of the hub main body 8. Therefore, the load is applied from the die 26 to the cylindrical portion 16, towards one end in the axial direction, and outwards in the radial direction, and the part wherein the load is applied in this manner changes continuously in the peripheral direction of the cylindrical portion 16 (the pressing part gyrates). As a result, even if the force applied to the die 26 is not particularly great, the cylindrical portion 16 is plastically deformed and a good quality crimped portion 14 is obtained. The inner ring 9 is thus fastened to the hub main body 8 by holding the other end surface of the inner ring 9 in the axial direction with the crimped portion 14 obtained in this manner. Also when the crimped portion 14 is formed in this manner, the outer ring 1 is rotated, or rocked in a reciprocating manner, in relation to the hub main body 8, and the rolling surfaces of the tapered rollers 17 are stabilized in contact with the raceways 5, 6, 11, and 12.

Furthermore, in Japanese Unexamined Patent Publication No. 2000-343905, rotary forging is also disclosed in place of the abovedescribed rocking die forging for the formation work for the crimped portion 14. When rotary forging is used, as shown in FIG. 11, one end of the hub main body 8 (opposite crimped end, bottom end in FIG. 11) is supported by the supporting bearing 29 so that it is able to rotate freely, and the outer ring 1 is fastened by a clamping jig and the like (not shown in the drawings) so that the inner ring 9 and the hub main body 8 are able to rotate freely inside the outer ring 1. The part towards the tip of a roll 30 being the compression member, is pressed strongly against part of the tip part of the cylindrical portion 16 provided at the other end of this hub main body 8 (crimped end, top end in FIG. 11). A concave part 31 is formed around the entire periphery on the peripheral surface of the part towards the tip of the roll 30. In this condition, therefore, if the inner ring 9 and the hub main body 8, and the roll 30 are rotated about their respective central axes, the tip part of the cylindrical portion 16 can be crimped and expanded outwards in the diameter direction to form the crimped portion 14.

In the case of plastic deformation of the cylindrical portion 16 formed on the end of the hub main body 8 to form the crimped portion 14, use of rocking die forging as shown in FIG. 10, or rotary forging as shown in FIG. 11, for this plastic deformation work involves application of load in the radial and axial directions from the die 26 (with rocking die forging as shown in FIG. 10) or the roll 30 (with rotary forging as shown in FIG. 11) to the hub main body 8. This load is borne by the outer ring 1 via the tapered rollers 17 existing in the direction wherein the load acts. In this case, the tapered rollers 17 bearing the load are the tapered rollers 17 constituting the second row of tapered roller bearings 4 close to the crimped portion 14.

When some of the tapered rollers 17 constituting the second row of tapered roller bearings 4 bear the load in this manner, no particular problems arise if a plurality of tapered rollers 17 bear the load. However a problem arises if only one tapered roller bears most of the load. That is to say, if only a single tapered roller 17 exists on the line whereon the load acts, almost all of the load is applied at the points of contact between the rolling surface of the tapered roller 17 and the second inner raceway 6 and the second outer raceway 12. As a result, the surface pressure at both points of contact becomes high, and indentations are formed readily on the raceways 6 and 12. When an indentation is formed, not only does vibration and noise increase when the wheel-support rolling bearing unit is used, but the rolling fatigue life of the raceways is reduced. In particular, when balls are used in place of the tapered rollers as the rolling elements constituting the wheel-support rolling bearing unit, the surface pressure at the points of contact between the rolling surface of each ball and the inner raceway and outer raceway becomes higher, and thus the problem readily becomes extreme.

The manufacturing method and manufacturing apparatus for a wheel-support rolling bearing unit of the present invention addresses the problems.

RELATED ART

The inventors of the present invention have previously invented a method addressing the aforementioned situation wherein a load based on the compression member forming the crimped portion pressing the cylindrical portion is constantly borne by a plurality of rolling elements, and the crimped portion is formed (Japanese Pending Patent Application No. 2001-22016). In the case of the method of this related invention, the outer diameter raceway member is rotated and each rolling element rotates at the same angular velocity as that of the oscillating rotation of the die (angular velocity of rotation). The direction of action of the load applied from this die to the inner diameter raceway member is constantly positioned in the intermediate part between adjacent rolling elements on the outer periphery. As a result, the excessive increase in surface pressure at the point of contact between the rolling surface of the relevant rolling element and the outer raceway and inner raceway, when the load is borne by a single rolling element is prevented, and the formation of indentations on each raceway is prevented.

In the case of the manufacturing method for a wheel-support rolling bearing unit according to the related invention as described above, while indentations can be prevented from forming on each raceway, research by the inventors of the present invention has found that the torque required to rotate the outer diameter raceway member becomes excessive in some cases. That is to say, it has been found that when the crimped portion is formed in a condition with the velocity at which each rolling elements rotates, and the velocity at which the die rotates matched, the torque required to rotate the outer diameter raceway member to rotate the rolling elements increases. When this torque increases, a large motor is required in the manufacturing apparatus for the wheel-support rolling bearing unit. When the torque increases further, the durability of the components of this manufacturing apparatus is lost. When the torque increases even further, it becomes no longer possible to form the crimped portion.

DISCLOSURE OF THE INVENTION

The wheel-support rolling bearing unit which is the subject of the manufacturing method and manufacturing apparatus for a wheel-support rolling bearing unit of the present invention, is provided with an outer diameter raceway member having first and second outer raceways on an inner peripheral surface, an inner diameter raceway member having first and second inner raceways on an outer peripheral surface, and a plurality of rolling elements provided so as to rotate freely between the first and second inner raceways and the first and second outer raceways.

The inner diameter raceway member comprises; a shaft member provided with the first inner raceway on the outer peripheral surface of a middle portion either directly or via a separate inner ring, and an inner ring provided with the second inner raceway on the outer peripheral surface. The inner ring is fitted onto one end (inside end) of the shaft member, and one axial end surface is held by means of a crimped portion formed by plastically deforming a cylindrical portion provided on one end (inside end) of the shaft member outwards in the radial direction, so that the inner ring is supported and fastened to the shaft member.

In the manufacturing method for a wheel-support rolling bearing unit of the present invention, in order to manufacture the aforementioned wheel-support rolling bearing unit, a load is applied by a compression member to a part around the periphery of the cylindrical portion, towards the other end (outside end) in the axial direction, and outwards in the radial direction, and the part to which this load is applied is changed continuously around the peripheral direction of the cylindrical portion so that the cylindrical portion is gradually plastically deformed to form the crimped portion.

In particular, the outer diameter raceway member is rotated in one direction in relation to the inner diameter raceway member, so that the rolling elements are rotated between the outer raceways and the inner raceways, and the cylindrical portion is pressed by the compression member to form the crimped portion. This forming work is conducted with a rotational velocity $n_C$ [min$^{-1}$] (rpm) of the rolling elements, and a rotational velocity $n_T$ [min$^{-1}$] of the compression member, being mutually different.

In this case, preferably a difference between the rotational velocity $n_C$ [min$^{-1}$] of the rolling elements and the rotational velocity $n_T$ [min$^{-1}$] of the compression member is at least 10 min$^{-1}$. For example, the rotational velocities $n_C$ and $n_T$ are assumed to be positive when in the direction of rotation of the compression member, and negative when in the opposite direction to the direction of rotation of the compression member. Consequently, when the direction of rotation of the compression member matches the direction of rotation of each rolling element, $|n_C - n_T| > 10$ or $|n_T - n_C| > 10$, and when the directions differ (mutually opposite directions of rotation), $|n_C + n_T| > 10$.

Moreover, the manufacturing apparatus for a wheel-support rolling bearing unit of the present invention comprises: a support block which supports the other end (outside end) of the inner diameter raceway member; a compression member for plastically deforming a cylindrical portion formed on one end (inside end) of the inner diameter raceway member; a rotating drive device for rotating the outer diameter raceway member; and a rotation limiting member provided to move freely back and forth in relation to the outer peripheral surface of the outer diameter raceway member, to limit rotation of the outer diameter raceway member when engaged with the outer peripheral surface. The rotating drive device is provided with: a drive source; a rotating ring which rotates around a central shaft of the outer diameter raceway member by means of the drive source; a rotation transmission member provided in a condition to freely permit rotation on the rotating ring, synchronized with the outer diameter raceway member, and to permit displacement in the axial direction of the outer diameter raceway member, and with an inner peripheral shape of a shape to fit in a non-circular manner on the outer peripheral surface of part of the outer diameter raceway member and so as to freely transmit rotation force; and a pressing member which presses the rotation transmission member in a direction to fit with an outer peripheral face of part of the outer diameter raceway member.

According to the manufacturing method and manufacturing apparatus for a wheel-support rolling bearing unit of the present invention configured as described above, since the crimped portion is formed while rotating the outer diameter raceway member, the formation of indentations on each raceway is prevented. Moreover, since a difference is provided between the rotational velocity of the compression member and the rotational velocity of the rolling elements (preferably the difference is at least 10 min$^{-1}$), an increase in the torque required to rotate the outer diameter raceway member can be suppressed.

BEST MODE FOR CARRYING OUT THE INVENTION

Figure 1:
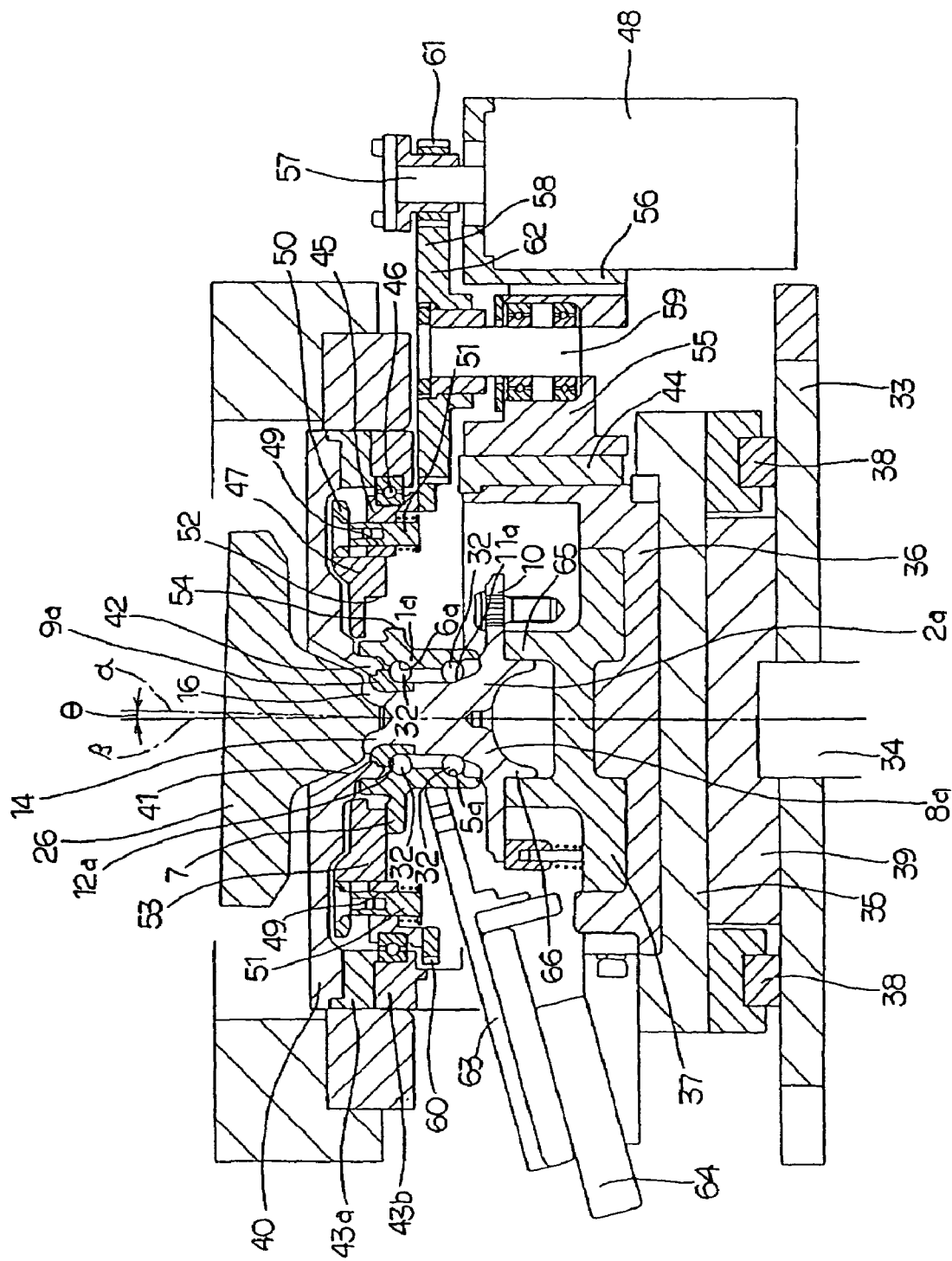
FIG. 1 is a cross-sectional view showing one example of an embodiment of the present invention, in a state of preparation for the work of forming a crimped portion.
Figure 2:
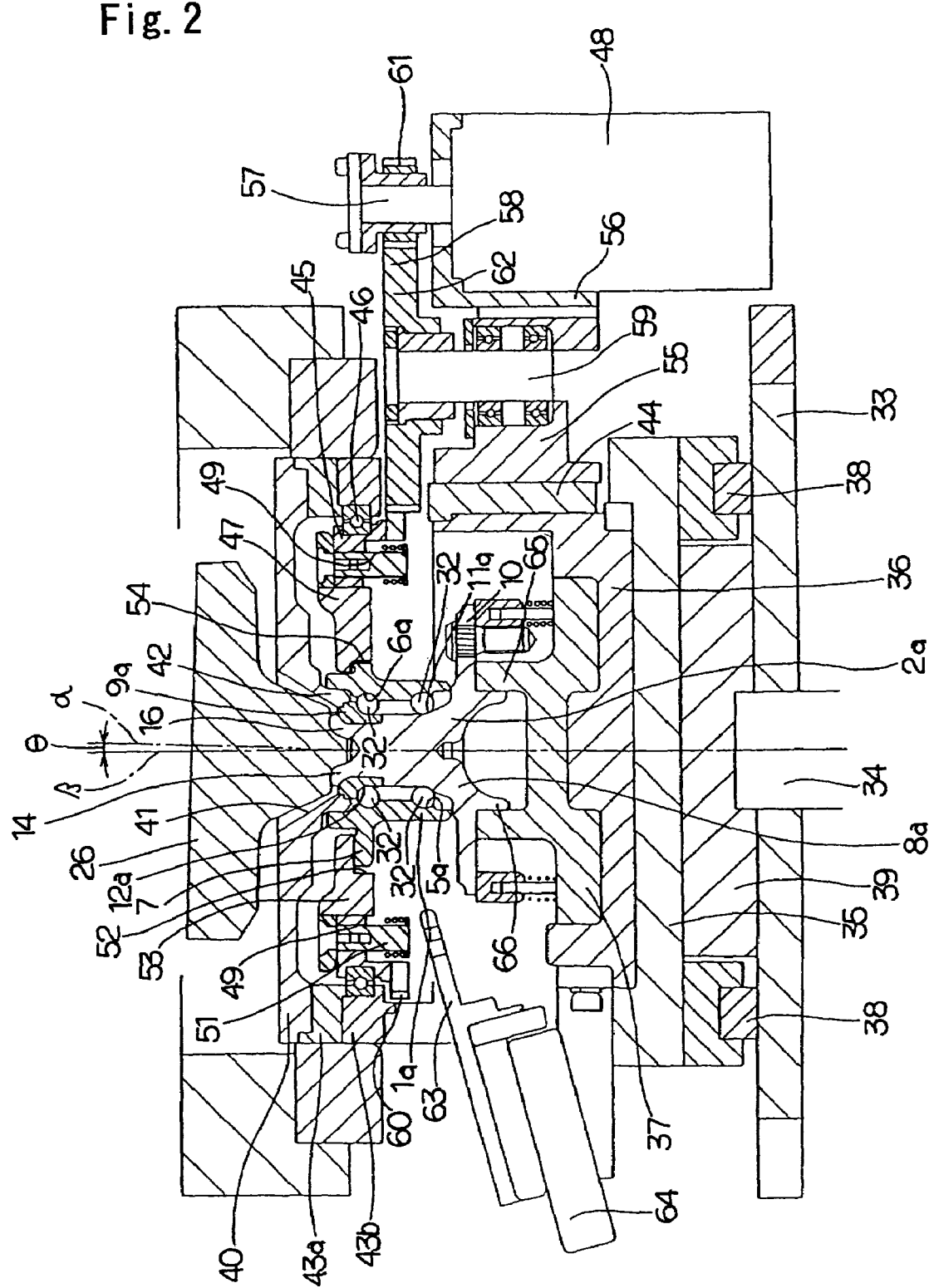
FIG. 2 is a cross-sectional view showing one example of the embodiment of the present invention, in a state of forming the crimped portion.
Figure 8:
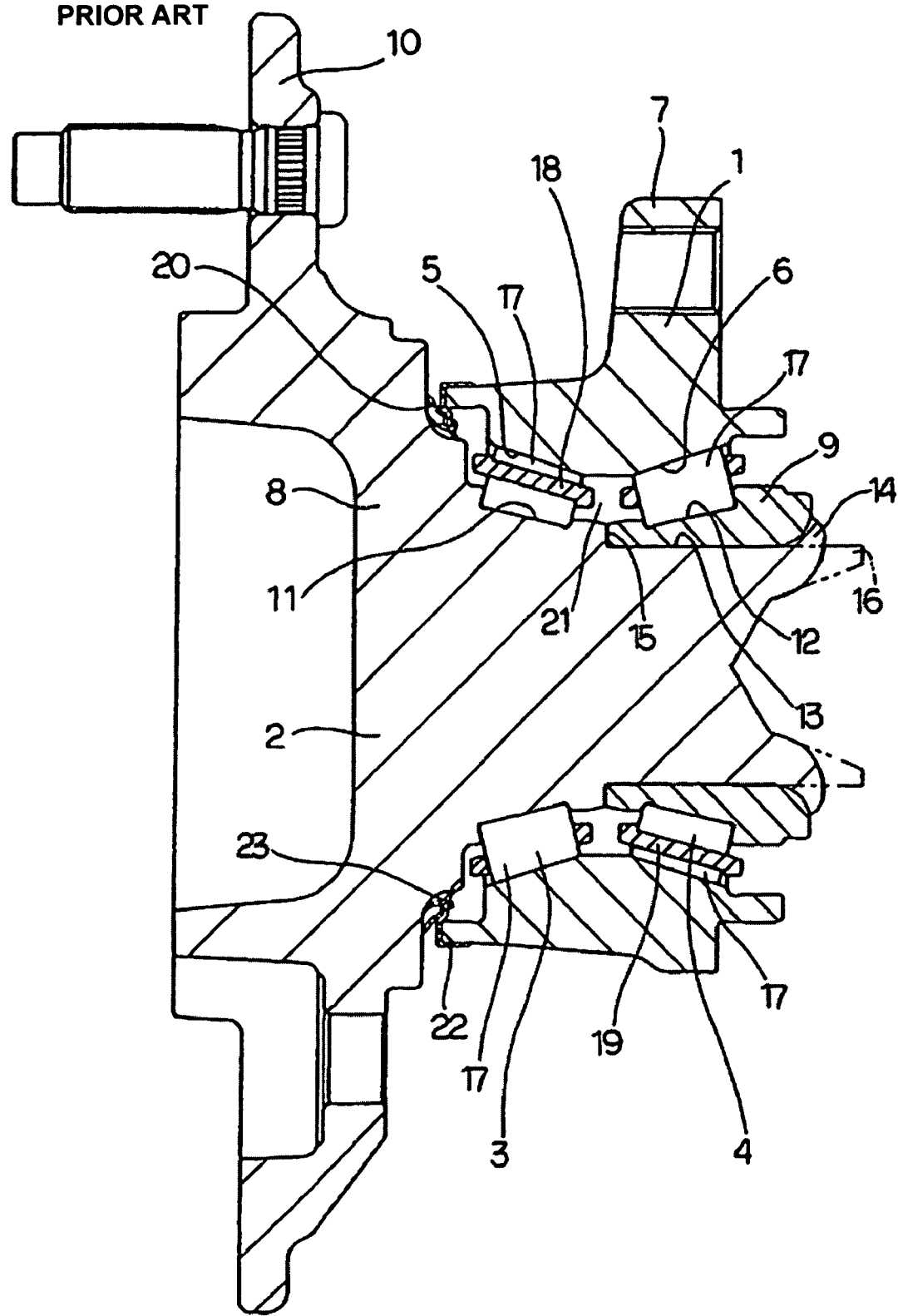
FIG. 8 is a cross-sectional view showing one example of a heretofore known wheel-support rolling bearing unit.

FIG. 1 and FIG. 2 show one example of an embodiment of the present invention. As explained above, when balls are employed as the rolling elements, indentations are readily formed in the surface of the raceway in association with formation of the crimped portion. That is to say, this effect is particularly apparent when the present invention is applied to a wheel-support rolling bearing unit employing balls as rolling elements. Therefore in the example shown in the figure, balls 32 are employed as the rolling elements. To match this, the cross-sectional shape of first and second inner raceways 11a and 12a formed on the outer peripheral surface of a hub 2a comprising first and second outer raceways 5a and 6a of the inner peripheral surface of an outer ring 1a, and a hub main body 8a and an inner ring 9a, are arc-shaped. Since the basic configuration of the wheel-support rolling bearing unit is the same as the aforementioned conventional structure shown in FIG. 8 apart from this point, the same reference symbols are applied to the same component elements and duplicate explanation is omitted, and the parts of the embodiment of the present invention are explained below. Moreover, the same reference symbols are applied to the same members in all drawings.

Firstly, the configuration of the manufacturing apparatus is explained by FIG. 1 and FIG. 2. The manufacturing apparatus of the present invention has a ramp 33. This ramp 33 is fastened to the top end of an output rod 34 of a pressing apparatus (main part not shown in the drawings) such as a hydraulic cylinder and the like, and is pushed upwards by the pressing apparatus when forming the crimped portion 14. The top surface of this ramp 33 is provided with a slide table 35 moving horizontally in the front and rear directions of FIG. 1 and FIG. 2, and a support block 37 is mounted on this slide table 35 via a holder 36. A backup plate 39 is fastened between a pair of sliders 38 on the top surface of the ramp 33, and the top surface of this backup plate 39 slides against and in contact with, or in proximity to, the bottom surface of the slide table 35.

The support block 37 supports the outside end (the end being the outside in the width direction when assembled in the vehicle, the bottom end in FIG. 1 and FIG. 2, and the other end disclosed in claims) of the hub main body 8a constituting the hub 2a being the inner diameter raceway member, and is provided with a support cylinder part 65 set at the center of the top surface. This support cylinder part 65 has an inner diameter able to freely fit inside with almost no play, a positioning cylinder part 66 provided on the outer end surface of the hub main body 8a for fitting onto the inner peripheral edge part of the wheel, and a top end shape able to be freely in close contact with the outer surface of a flange 10 provided on the outer peripheral surface of the hub main body 8a.

Figure 10:
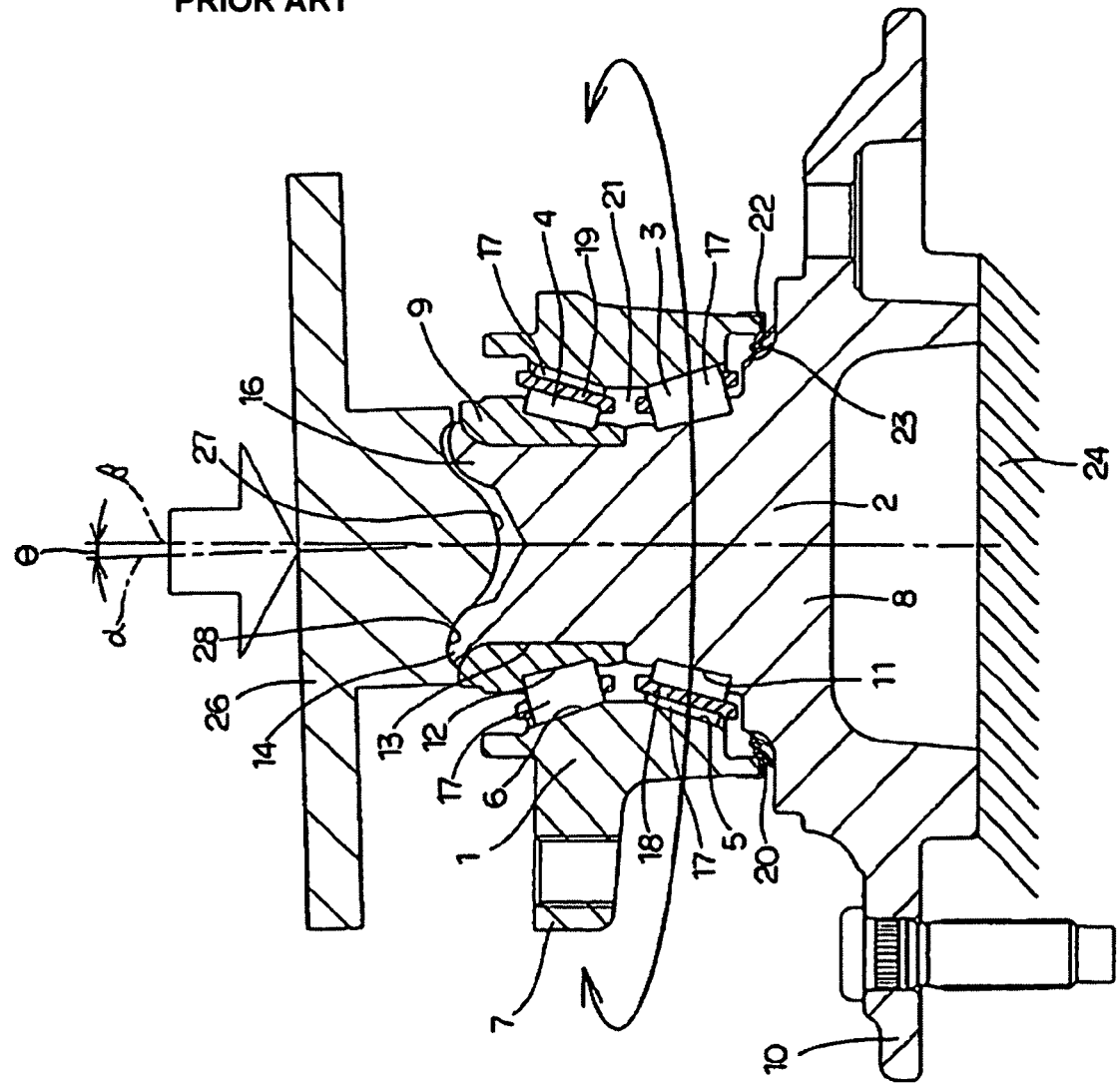
FIG. 10 is a cross-sectional view showing a state where a crimped portion is formed by the first example of the heretofore known manufacturing method for a wheel-support rolling bearing unit.
Figure 11:
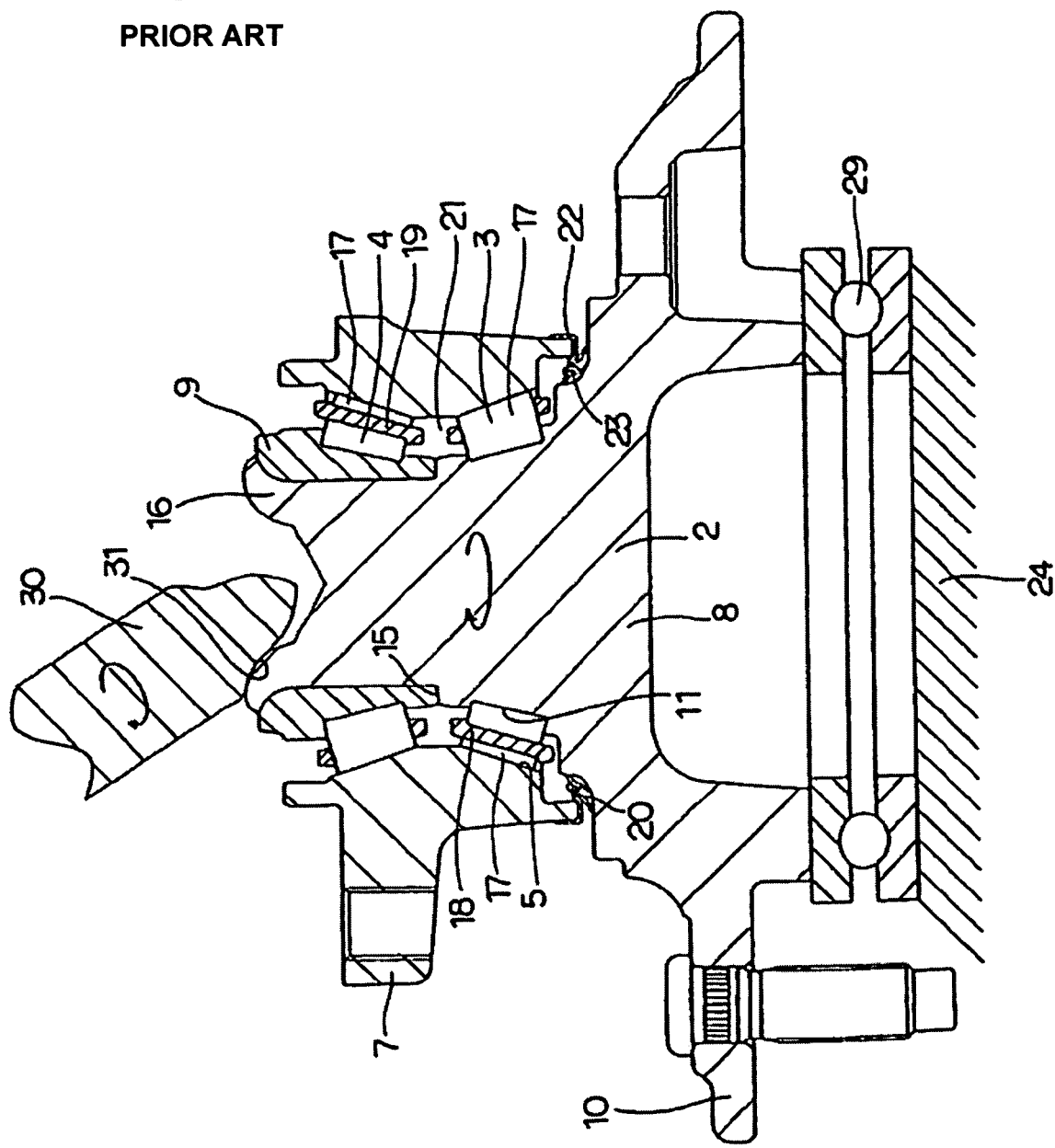
FIG. 11 is a cross-sectional view showing a state where a crimped portion is formed by a second example of a heretofore known manufacturing method for a wheel-support rolling bearing unit.

Furthermore, a die 26 being the compression member for plastically deforming the cylindrical portion 16 formed on the inside end of the hub main body 8a, is provided above of the support block 37. This die 26 is supported on the bottom part of a support head (not shown in drawings). As with the aforementioned conventional apparatus shown in the FIG. 10, the central axis α of the die is inclined at a small angle θ to the central axis β of the hub main body 8a. When the crimped portion 14 is formed on the inner end of the hub main body 8a, the die 26 is oscillated with its central axis a circulating around the central axis β of the hub main body 8. Then by pushing the ramp 33 upwards in this condition, the top edge of the cylindrical portion 16 is pressed against the bottom surface of the die 26. Loads are then applied from this die 26 to part around the peripheral direction of the cylindrical portion 16, outwards (downwards in FIG. 1, to the other end disclosed in claims) in relation to the axial direction, and outwards in relation to the diameter directions. The position wherein the load is applied to the cylindrical portion 16 in this manner changes continuously in relation to the peripheral direction of the cylindrical portion 16 in association with the oscillation of the central axis α. The die 26 is of high rigidity to ensure that damage such as cracking and the like due to the reaction associated with compression of this cylindrical portion 16 does not occur, and is of a tapered shape inclined in the direction of increasing diameter with distance from the tip part employed in forming the crimped portion (upwards).

Moreover, a ring-shaped support frame 40 is provided around the die 26. A mortar-shaped through-hole 41 having an inner peripheral surface inclined in the direction wherein the inside diameter increases towards the top, is provided in the center of this support frame 40 to allow the oscillating movement of the die 26. Furthermore, a short approximately cylinder-shaped holding cylinder 42 is formed in the bottom surface of the support frame 40 in the part surrounding the through-hole 41. This holding cylinder 42 functions to prevent oscillation in the radial direction of the hub main body 8a when the cylindrical portion 16 is formed into the crimped portion 14 with the die 26. Therefore the inner peripheral surface of the bottom end of the holding cylinder 42 has a stepped-shape to enable its free fitting onto the inner ring 9a fitted onto the inside end of the hub main body 8a. The support frame 40 is supported such that it is able to move freely up and down to a slight extent on part of the frame (not shown in drawings).

Furthermore, a segmented cylinder-shaped retainer cylinder 44 is suspended and fastened on the part of the support frame 40 towards the outer periphery of the bottom surface via a top and bottom pair of connected rings 43a and 43b. This retainer cylinder 44 is fitted onto the holder 36 with the ramp 33 raised and the support frame 40 lowered. Moreover, a drive ring 45 being a rotating ring is supported on the inside of the connected ring 43b by a roller bearing 46 such as to enable free rotation. As with a revolving ring, this roller bearing 46 has a structure able to bear freely radial loads and thrust loads. The drive ring 45 is for rotating the outer ring 1a being the outer diameter raceway member, at the prescribed velocity when the crimped portion 14 is formed with the die 26, and is rotated by a motor 48 in a condition with an annular drive jig 47 being the rotating transmission member described in claims fitted onto a mounting part 7 provided on the outer peripheral surface of this outer ring 1a.

The drive jig 47 is able to move freely up and down to a slight extent in relation to this drive ring 45, and is assembled such that it is able to rotate freely synchronized with this drive ring 45. Therefore, in the case of this example, support holes 49 are formed parallel to the central axis of the drive ring 45 at a plurality of points (for example, 4 to 6 points) around the peripheral direction of the drive ring 45. Furthermore, the base end of guide pins 51 placed parallel with the central axis of the drive jig 47 are connected and fastened to the part matching each support hole 49 by part of the mounting flange 50 fastened to the top end of the outer peripheral surface of the drive jig 47. Then each of these guide pins 51 is inserted through the respective support holes 49, and a compression spring being a pressing member is provided between the top surface of the rim part formed on the bottom part of each of these guide pins 51, and the bottom surface of the mounting flange 50.

Figure 3:
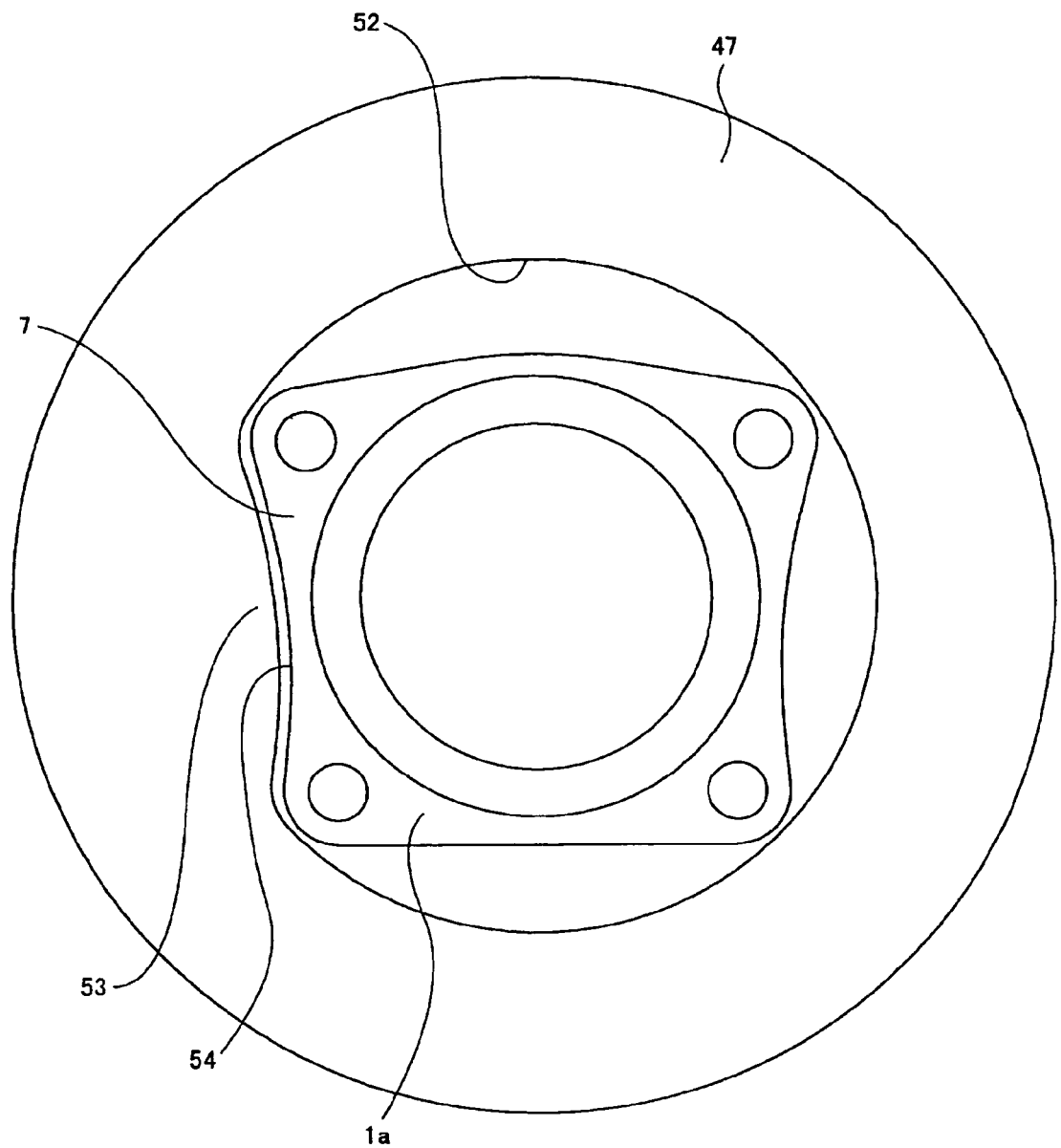
FIG. 3 is a view from the bottom of FIG. 2 with a drive jig and an outer ring removed.

The drive jig 47 according to this configuration, is supported such that when provided with a resilient force in the downwards direction, it is able to move freely up and down to a slight extent in relation to the drive ring 45, and rotate freely synchronized with the drive ring 45. A concave part 52 fitting in a non-circular manner with the outer peripheral edge of the mounting part 7 is formed on a part close to the inner periphery of the bottom surface of the drive jig 47. In this example, as shown in FIG. 3, a shape of the inner peripheral surface of the concave part 52 adopts a shape wherein part of the cylindrical surface is expanded radially inwards to give a bulged part 53. The bulged part 53, in a condition with the phase of the concave part 52 and the mounting part 7 matched, is connected to a concave edge part 54 existing in the outer peripheral edge part of the mounting part 7, so that the rotating force is freely transmitted from the drive jig 47 to the outer ring 1a. Transmission of the rotating force from the drive ring 45 to the drive jig 47 may be performed by the guide pins 51. However if the connection between the inner peripheral surface of the drive ring 45 and the outer peripheral surface of the drive jig 47 is by non-circular engagement such as with a splined connection and the like, application of a large force to the guide pins 51 is prevented, and durability of the manufacturing apparatus is improved.

On the other hand, the motor 48 (generally an electric motor, however a hydraulic motor may be used) which rotates the drive ring 45 is supported on and fastened to the outer peripheral surface of part of the retainer cylinder 44 by a connecting bracket 55 and a retainer bracket 56. The motor 48 is therefore raised and lowered together with the support frame 40. An output shaft 57 of the motor 48 and the drive ring 45 are connected by a reduction gear mechanism 58, to rotate the drive ring 45 freely in the prescribed direction at the prescribed speed. In this manner, the velocity of rotation of the output shaft 57 of the motor 48 is reduced by a speed-reduction apparatus such as the reduction gear mechanism 58 and the like, and the drive ring 45 which rotates the outer ring 1a is rotated, and the motor 48 can be of a small size. Moreover, the outer ring 1a is rotated at low velocity, thus reducing vibration of the manufacturing apparatus.

To construct the reduction gear mechanism 58, an intermediate shaft 59 is supported so as to be freely rotatable on the connecting bracket 55, while positioned in parallel to the output shaft 57 and the central shaft of the drive ring 45. Furthermore, a major reduction gear 60 is fastened to the part close to the outer periphery of the bottom surface of the drive ring 45. This major reduction gear 60 and a minor reduction gear 61 fastened to the tip of the output shaft 57 (top end in drawings) are meshed via an intermediate gear 62 fastened to the top end of the intermediate shaft 59. With this configuration, the drive ring 45 is rotated freely in the same direction as the output shaft 57, and at a lower velocity than the output shaft 57.

A holder rod 63 being a rotation limiting member is provided above the support block 37 so as to be freely movable back and forth in relation to the outer peripheral surface of the outer ring 1a. In this example, therefore, an actuator 64 such as a pneumatic cylinder or the like is fastened to the part corresponding to a discontinuous part of the retainer cylinder 44 on the outer peripheral surface of the holder 36, and the holder rod 63 is able to be displaced freely in the radial direction of the outer ring 1a by the actuator 64. When the concave part 52 of the drive jig 47 is fitted against the mounting part 7 while the drive jig 47 is lowered together with the drive ring 45 by an actuator such as a hydraulic cylinder (not shown in drawings) or the like, the drive jig 47 is immediately rotated in the prescribed direction by the motor 48. In this case, the holder rod 63 does not operate (displacement towards the outer peripheral surface of the outer ring 1a), and remains separated from the outer peripheral surface of the outer ring 1a.

On the other hand, when the part separated from the concave part 52 on the bottom surface of this drive jig 47 is on the mounting part 7 when the drive jig 47 is lowered, the drive jig 47 is rotated by the motor 48 at low velocity (for example, between a few $min^{-1}$ and few tens of $min^{-1}$) in the reverse direction to the prescribed direction. In this case, the holder rod 63 is moved forward towards the outer peripheral surface of the outer ring 1a as shown in FIG. 1 by the actuator 64, and the torque required to rotate the outer ring 1a increases based on the frictional engagement between the tip of the holder rod 63 and the outer peripheral surface of the outer ring 1a. The outer ring 1a does not rotate together with the drive jig 47. On the other hand, when as shown in FIG. 2 the holder rod 63 is withdrawn from the outer peripheral surface of the outer ring 1a, the torque required to rotate the outer ring 1a decreases. Furthermore, it is desirable that a material being softer than the metal material (carbon steel) constituting the outer ring 1a such as a hard rubber, synthetic resin, soft metal and the like is provided on the tip of the holder rod 63 to prevent damage to the outer peripheral surface of the outer ring 1a.

Next is a description of the action of plastically deforming the cylindrical portion 16 provided at the inside end of the hub main body 8a to form the crimped portion 14, using the manufacturing apparatus configured as explained above.

Firstly, the hub main body 8a is mounted on the top surface of the support block 37, with the ramp 33 lowered and displaced in the front and rear direction in FIG. 1 and FIG. 2, and the support block 37 withdrawn from beneath the die 26. The inner ring 9a is previously fitted onto the inside end of the hub main body 8a.

Next, the ramp 33 is inserted beneath the die 26 until the central shaft of the hub main body 8a and the central shaft of the support frame 40 are aligned. The holding cylinder 42 is then lowered, and the bottom end of the holding cylinder 42 is fitted onto the inner ring 9a as shown in FIG. 1. Moreover, the drive jig 47 is lowered together with the holding cylinder 42. When the concave part 52 of the drive jig 47 is fitted against the mounting part 7 when the drive jig 47 is lowered, a microswitch detects that the concave part 52 and the mounting part 7 are fitted together and that the drive jig 47 has been sufficiently lowered. Power is then supplied to the previously stopped motor 48, and the drive jig 47 is rotated in the prescribed direction. In this case, the holder rod 63 does not operate (displacement towards the outer peripheral surface of the outer ring 1a), and remains separated from the outer peripheral surface of the outer ring 1a.

On the other hand, when the part separated from the concave part 52 on the bottom surface of this drive jig 47 is on the mounting part 7 when the drive jig 47 is lowered, lowering of the drive jig 47 is prevented, and the compression spring provided around the guide pins 51 is compressed. In this condition the microswitch does not detect lowering of the drive jig 47. Therefore, in this case the holder rod 63 is moved forward, and the tip of the holder rod 63 and the outer peripheral surface of the outer ring 1a are frictionally engaged, and the drive jig 47 is rotated by the motor 48 at low velocity (for example, between a few min$^{-1}$ and few tens of min$^{-1}$) in the reverse direction to the prescribed direction, and through a prescribed angle (for example, approximately half a turn or less).

As a result, in the condition with the phase of the concave part 52 and the mounting part 7 matched, the drive jig 47 is lowered and this lowering is detected by the microswitch. Since the rotation of the drive jig 47 is at low velocity, then provided the phase of the concave part 52 and the mounting part 7 match, the drive jig 47 can be reliably lowered, and the concave part 52 and the mounting part 7 can be fitted together. That is to say, in the condition with matching in the peripheral direction, of the phase of the bulged part 53 on the inner peripheral surface of the concave part 52 formed in the bottom surface of the drive jig 47, and one of the pair of concave edge parts 54 on the outer peripheral edge of the mounting part 7, the drive jig 47 is lowered under its own weight and the force of the compression springs positioned around the guide pins 51, and the mounting part 7 is fitted into the concave part 52. In this condition, the rotation of the drive jig 47 is transmitted freely to the outer ring 1a. Therefore the holder rod 63 is withdrawn from the outer peripheral surface of the outer ring 1a, and the motor 48 is stopped and then restarted to rotate the drive jig 47 in the prescribed direction.

Figure 9:
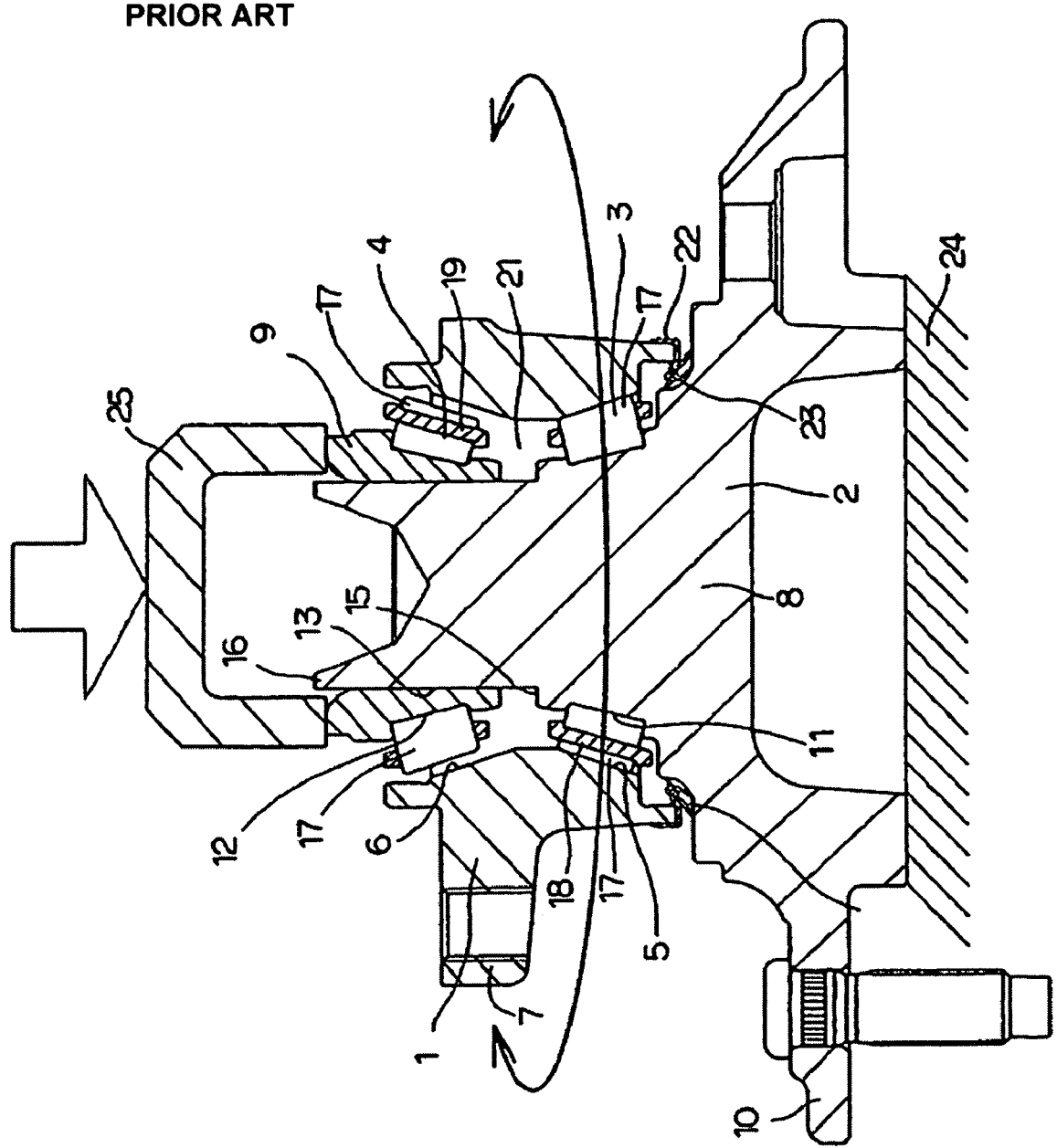
FIG. 9 is a cross-sectional view showing an inner ring fitted onto and fastened to a hub in a first example of a heretofore known manufacturing method for a wheel-support rolling bearing unit.

It is also possible that the drive jig 47 continues to rotate by a preset amount (approximately half a turn) after the mounting part 7 and the concave part 52 are fitted together. In this case, the tip of the holder rod 63 and the outer peripheral surface of the outer ring 1a slide against each other and are subject to friction, and the drive torque required of the motor 48 increases. However, since the rotational velocity of the drive jig 47 in this condition is low, no particular problem arises. On the other hand, if configured as explained above, since fitting together of the mounting part 7 and the concave part 52 is detected by the microswitch, and the holder rod 63 is withdrawn immediately from the outer peripheral surface of the outer ring 1a and the motor 48 is stopped temporarily, the situation of the tip of the holder rod 63 and the outer peripheral surface of the outer ring 1a sliding against each other with friction is almost non existent. FIG. 1 shows the crimped portion 14 formed on the inner end of the hub main body 8a. However in the initial stage of this crimped portion forming work shown in FIG. 1, as explained above in FIG. 9, the crimped portion 14 is not yet formed on the inner end of the hub main body 8a.

In any case, the mounting part 7 and the concave part 52 are fitted together and the outer ring 1a is rotated freely by the drive jig 47 to complete preparations for lowering the crimped portion 14. Then the outer ring 1a is rotated, for example, a few hundred min$^{-1}$ by the motor 48 and the ramp 33 raised, and the cylindrical portion 16 formed on the end of the inside part of the hub main body 8a is plastically deformed by the die 26. The crimped portion 14 is then formed, and the inner peripheral surface of the inner ring 9a is held by the crimped portion 14. At this time, the central axis α of the die 26 is oscillated around the central axis β of the hub main body 8a. The cylindrical portion 16 is pressed against the bottom surface of the die 26 oscillated in this manner, based on the rising force of the output rod 34 of the pressing apparatus such as the hydraulic cylinder and the like. At this time, since the hub main body 8a provided with the cylindrical portion 16 does not rotate, load is applied to a part around the peripheral direction of the cylindrical portion 16, towards the other end (outside end) in the axial direction, and outwards in the radial direction, and the part to which this load is applied changes continuously in the peripheral direction of the cylindrical portion 16.

As a result, this cylindrical portion 16 is plastically deformed continuously and gradually in the peripheral direction, forming the crimped portion 14. As the cylindrical portion 16 is formed into the crimped portion 14, the hub main body 8a and the ramp 33 whereon the hub main body 8a is mounted, the support frame 40, the motor 48, the reduction gear mechanism 58, and the like, gradually rise. As the crimped portion 14 is formed, the thrust load applied to the slide table 35 is borne by the output rod 34 via the backup plate 39. Therefore an excessive load does not act on the slider 38, and sufficient durability of the slider 38 can be ensured.

In particular, in the case of the manufacturing method for a wheel-support rolling bearing unit of the present example, during formation of the crimped portion 14 from the cylindrical portion 16, the outer ring 1a is rotated in one direction by the motor 48 with the hub main body 8a remaining in a static condition. Moreover, while the balls 32 are rolling between the first and second outer raceways 5a and 6a, and the first and second inner raceways 11a and 12a, the cylindrical portion 16 is pressed with the die 26 to form the crimped portion 14. At this time, the rotational velocity $n_C$ [min$^{-1}$] of the balls 32 and the rotational velocity (velocity of oscillation around the axis) $n_T$ [min$^{-1}$] of the die 26 are made mutually different by appropriately controlling the direction and velocity of rotation of the motor 48 and the direction and velocity of oscillation of the die 26. The greater the difference between the rotational velocities $n_C$ and $n_T$, the more the drive torque required to the motor 48 can be reliably reduced. Consequently, in terms of reducing this drive torque, it is desirable to ensure that the difference between the rotational velocities $n_C$ and $n_T$ is at least 10 min$^{-1}$.

Figure 7:
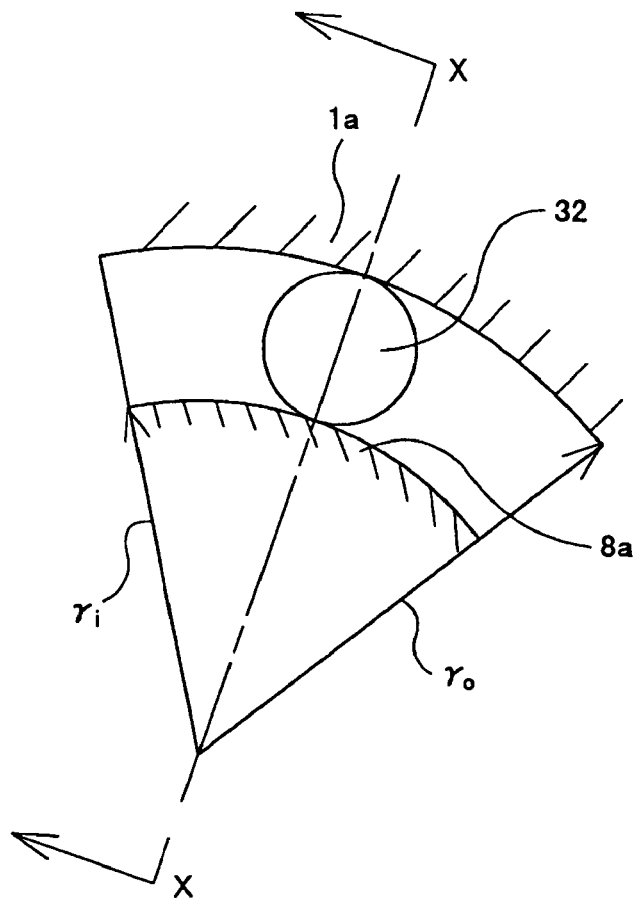
FIG. 7(A) and FIG. 7(B) are schematic drawings to explain the relationship between the rotational velocity of the outer ring and the rotational velocity of the balls, FIG. 7(A) being a view from the top of FIG. 1 or FIG. 2, and FIG. 7(B) being a cross-sectional view on X—X of FIG. 7(A).
Figure 7:
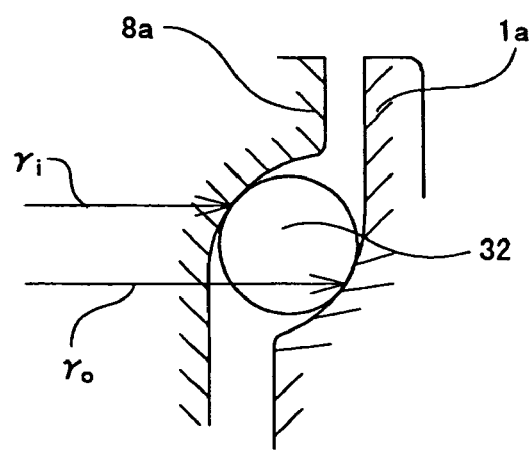

As shown in FIGS. 7 (A) and (B), if the distance from the center of the outer ring 1a to the point of contact between the outer ring raceway and the rotating surface of the balls 32 is assumed as $r_o$, and the distance from the center of the hub main body 8a to the point of contact between the inner ring raceway and the rotating surface of the balls 32 is assumed as $r_i$, it is well known that the relationship between the rotational velocity $n_C$ of the balls 32 and the rotational velocity $n_o$ (rotating velocity) of the outer ring 1a is $n_C = \{r_o/$ $(r_o+r_i)\}$ $n_o$. Consequently the direction and velocity of rotation of the motor 48 are appropriately controlled by the relationship between the direction of oscillation and velocity of oscillation of the die 26, so that there is a difference between the rotational velocity $n_C$ [min$^{-1}$] of the balls 32 and the rotational velocity (velocity of oscillation around the axis) $n_T$ [min$^{-1}$] of the die 26 found with this equation, and furthermore, preferably so that the difference between the rotational velocities $n_C$ and $n_T$ ($\ln_C-n_T\vert$) is at least 10 min$^{-1}$. The direction of oscillation of this die 26 and the direction of rotation of the balls 32 may be the same or opposite. Essentially, it is necessary that the difference between the rotational velocities $n_C$ and $n_T$ ($\ln_C-n_T\vert$) is at least 10 min$^{-1}$, and more preferably at least 50 min$^{-1}$. In this case, values are set such that $|\ln_C|-|n_T||>10$ or $|\ln_T|-|n_C||>10$ to ensure that the direction of rotation of the die 26 and the direction of rotation of each of the balls 32 match, and values are set such that $|\ln_C|+|n_T||>10$ to ensure that the directions do not match (opposite directions). In this case, if the direction of rotation of the die 26 and the direction of rotation of each of the balls 32 are opposite, then without increasing the absolute values of the rotational velocities $n_C$ and $n_T$, the difference in these two rotational velocities $n_C$ and $n_T$ is $|\ln_C|+|n_T||$, which can be much greater than the difference $|\ln_C|-|n_T||$ for when the directions are matched. Therefore there is an advantage in that while controlling the rotation velocity of the output shaft 57 of the motor 48, the drive torque of the drive ring 45 for rotating the outer ring 1a is kept low. The aforementioned difference has no particular upper limit. It is determined by design in consideration of the need for efficiency in forming the crimped portion 14, the need for durability of the manufacturing apparatus, and manufacturing cost, and the like.

In any case, the work of plastically deforming the crimped portion 14 with the die 26 is conducted while oscillating the central axis of the die 26. Consequently, the contact part (forming part) between the tip surface of the die 26 and the tip surface part of the cylindrical portion 16 moves around the peripheral direction of the cylindrical portion 16 while rotating. However, when commencing forming work, if the tip surface of the die 26 and the tip of the cylindrical portion 16 are displaced relative to each other at the instant the tip surface of the die 26 and the tip of the cylindrical portion 16 come into contact, welding may occur at the contact part. Therefore in order to eliminate the relative displacement of the tip surface of the die 26 and the tip part of this cylindrical portion 16 at the instant of contact, preferably the ramp 33 is raised with the die 26 stopped, and the tip surface of the die 26 and the tip part of this cylindrical portion 16 are contacted. Oscillation of the die 26 around the central axis is commenced following contact (light contact is desirable) with the part to be formed.

In the present example, as explained above, since the balls 32 are continuously rotated and the cylindrical portion 16 is plastically deformed by the die 26, damage such as indentations and the like do not occur on the first outer raceway 5a and the first inner raceway 11a far from the cylindrical portion 16, nor on the second outer raceway 6a and the second inner raceway 12a close to the cylindrical portion 16. That is to say, since the velocity of movement (rotation) in the peripheral direction, of the part where the die 26 presses the cylindrical portion 16, and the rotational velocity of the balls 32 differ (for example, at least 10 min$^{-1}$), each of the balls 32 move in the peripheral direction in relation to the pressing part. It has been found by experiment by the inventor of the present invention that the indentations and the like do not occur when the outer ring 1a is rotated and each ball 32 is rolled continuously during the work of forming the cylindrical portion 16 into the crimped portion 14. This is thought to be due to the fact that the part receiving a large load in association with the work of forming the crimped portion 14 is continuously changing.

Moreover, it has also been verified by experiment by the inventor of the present invention that, if a difference between the rotational velocities $n_C$ and $n_T$ is provided (a difference in $|\ln_C-n_T|$ of at least 10 min$^{-1}$ is particularly desirable), the torque required to rotate the outer ring 1a does not become excessively large. This point is explained with reference to FIG. 4 through FIG. 6.

Figure 4:
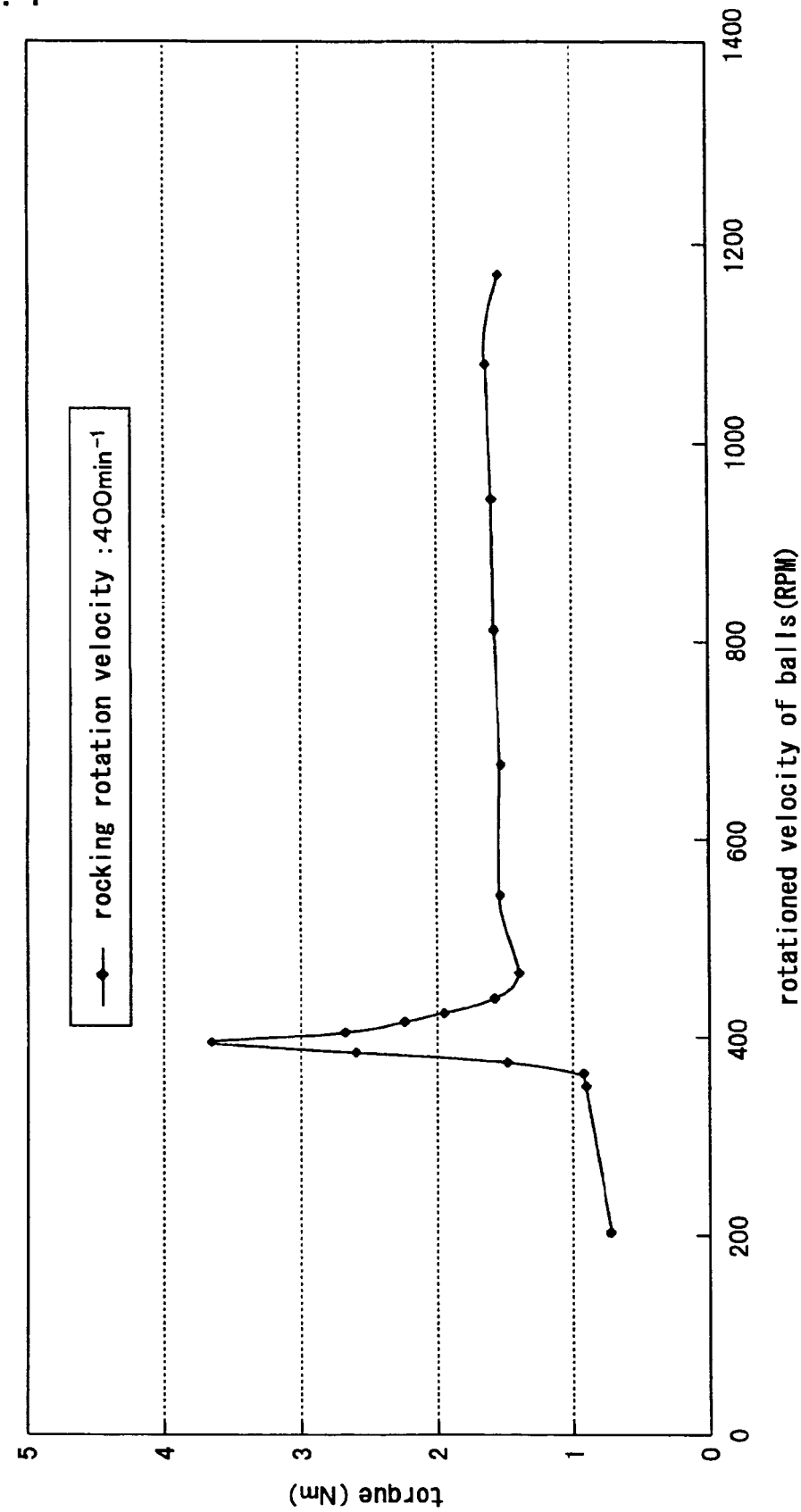
FIG. 4 is a graph showing a first example of a relationship between the rotational velocity of the balls and the torque required to rotate the outer ring.
Figure 5:
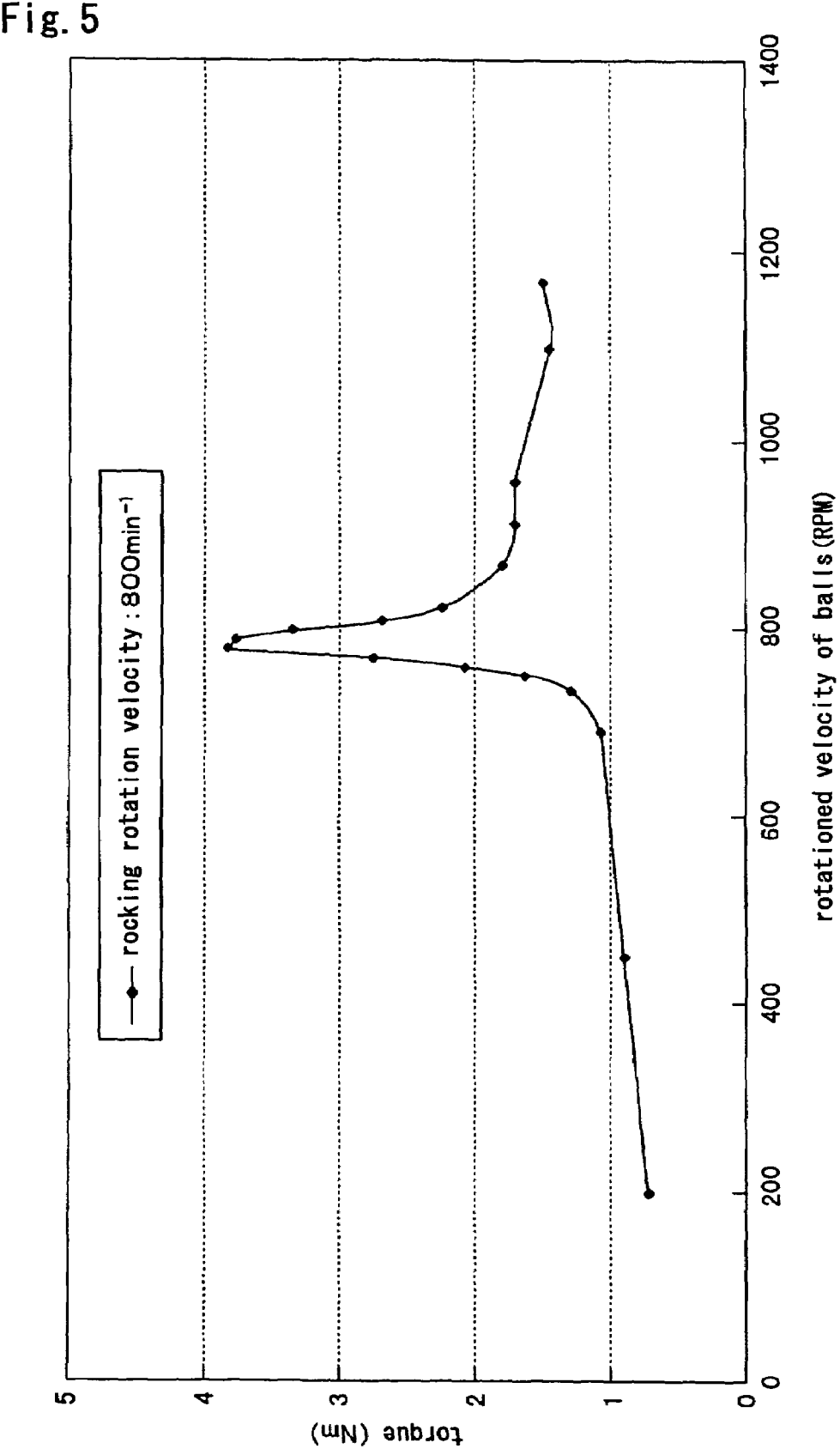
FIG. 5 is a graph showing a second example of a relationship between the rotational velocity of the balls and the torque required to rotate the outer ring.
Figure 6:
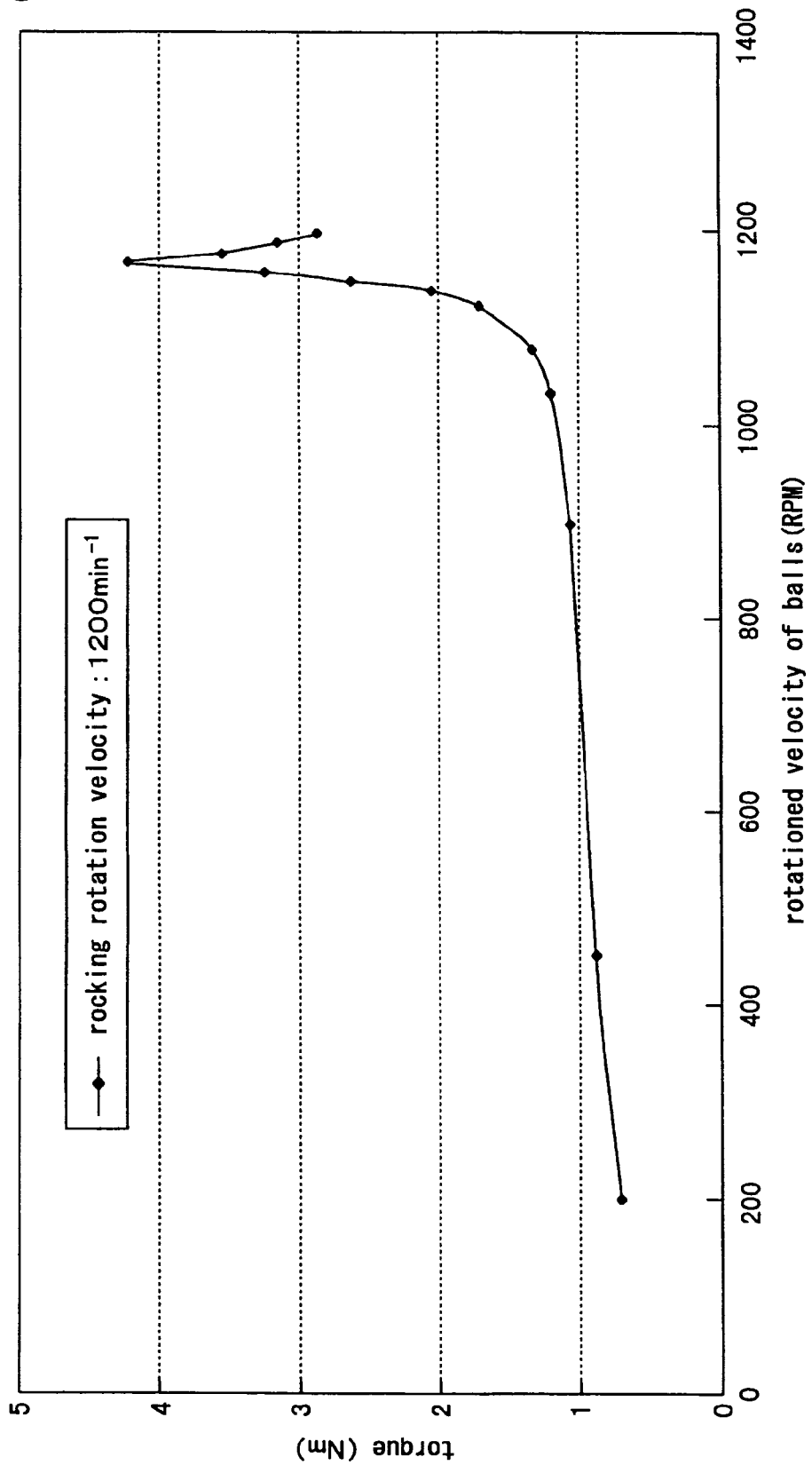
FIG. 6 is a graph showing a third example of a relationship between the rotational velocity of the balls and the torque required to rotate the outer ring.

FIG. 4 through FIG. 6 show the relationship between the rotational velocity $n_C$ of the balls 32 and the torque required to rotate the outer ring 1a, with the velocity of oscillation of the die 26 around the central axis (rocking rotation velocity=rotational velocity $n_T$) constant. FIG. 4 shows the velocity of oscillation around the central axis as 400 min$^{-1}$, FIG. 5 shows it as 800 min$^{-1}$, and FIG. 6 shows it as 1200 min$^{-1}$.

As is clear from FIG. 4 through FIG. 6, when the rotational velocity $n_T$ of the die 26 and the rotational velocity $n_C$ of the balls 32 match, the torque required to rotate the outer ring 1a becomes extremely large. If a difference is provided between the rotational velocities $n_T$ and $n_C$, the torque rapidly becomes small. Moreover this torque is reduced as the difference between the rotational velocities $n_T$ and $n_C$ increases. In particular, if the difference between the rotational velocities $n_C$ and $n_T$ ($|\ln_C-n_T|$) is at least 10 min$^{-1}$, the outer ring 1a can be rotated sufficiently, and this outer ring 1a can be more readily rotated if this difference is at least 50 min$^{-1}$ (particularly at least 100 min$^{-1}$).

INDUSTRIAL APPLICABILITY

According to the manufacturing method and manufacturing apparatus for a wheel-support rolling bearing unit of the present invention as explained above, the formation of indentations on each raceway in association with the work of forming the crimped portion 14 as with the previous invention can be prevented. Therefore a wheel-support rolling bearing unit having low vibration and noise in operation, and excellent durability can be obtained.

Furthermore, with the present invention, an excessive increase in the torque required to rotate the outer ring can be prevented, and in particular, the work of manufacturing the wheel-support rolling bearing unit can be stabilized without the use of a large apparatus.

The invention claimed is:

1. A manufacturing method for a wheel-support rolling bearing unit for manufacturing a wheel-support rolling bearing unit provided with; an outer diameter raceway member having first and second outer raceways on an inner peripheral surface, an inner diameter raceway member having first and second inner raceways on an outer peripheral surface, and a plurality of rolling elements provided so as to rotate freely between the first and second inner raceways and the first and second outer raceways, the inner diameter raceway member comprising; a shaft member provided with the first inner raceway on the outer peripheral surface of a middle portion either directly or via a separate inner ring, and an inner ring provided with the second inner raceway on the outer peripheral surface, and the inner ring is fitted onto one end of the shaft member, and one axial end surface is held by means of a crimped portion formed by plastically deforming a cylindrical portion provided on one end of the shaft member outwards in the radial direction, so that the inner ring is supported and fastened to the shaft member, the method comprising: applying a load by a compression member to a part around the periphery of the cylindrical portion, towards the other end in the axial direction, and outwards in the radial direction, and changing the part to which this load is applied continuously around the peripheral direction of the cylindrical portion so that the cylindrical portion is gradually plastically deformed to form the crimped portion, wherein the outer diameter raceway member is rotated in one direction in relation to the inner diameter raceway member, so that the rolling elements are rotated between the outer raceways and the inner raceways, and the cylindrical portion is pressed by the compression member to form the crimped portion, and this forming work is conducted with a rotational velocity $n_C$ (min$^{-1}$) of the rolling elements, and a rotational velocity $n_T$ (min$^{-1}$) of the compression member, being mutually different.

2. A manufacturing method for a wheel-support rolling bearing unit according to claim 1, wherein the crimping process is performed in a condition with a difference between the rotational velocity nC of the rolling elements and the rotational velocity nT of the compression member of at least 10 min-1.

3. A manufacturing method for a wheel-support rolling bearing unit according to either one of claim 1, wherein rotation of a motor output shaft is reduced and transmitted to the outer diameter raceway member, to rotate the outer diameter raceway member.

4. A manufacturing method for a wheel-support rolling bearing unit according to claim 1, wherein the rotation direction of the rolling elements and the rotation direction of the compression member are mutually opposite.

5. A manufacturing apparatus for a wheel-support rolling bearing unit for realizing the manufacturing method for a wheel-support rolling bearing unit according to claim 1, comprising: a support block which supports the other end of the inner diameter raceway member; a compression member for plastically deforming a cylindrical portion formed on one end of the inner diameter raceway member; a rotating drive device for rotating the outer diameter raceway member; and a rotation limiting member provided to move freely back and forth in relation to the outer peripheral surface of the outer diameter raceway member, to limit rotation of the outer diameter raceway member when engaged with the outer peripheral surface, and the rotating drive device is provided with: a drive source; a rotating ring which rotates around a central shaft of the outer diameter raceway member by means of the drive source; a rotation transmission member provided in a condition to freely permit rotation on the rotating ring, synchronized with the outer diameter raceway member, and to permit displacement in the axial direction of the outer diameter raceway member, and with an inner peripheral shape of a shape to fit in a non-circular manner on the outer peripheral surface of part of the outer diameter raceway member and so as to freely transmit rotation force; and a pressing member which presses the rotation transmission member in a direction to fit with an outer peripheral face of part of the outer diameter raceway member.

* * * * *